(12) United States Patent
Ikunami

(10) Patent No.: US 8,310,821 B2
(45) Date of Patent: Nov. 13, 2012

(54) STRUCTURE FOR ASSEMBLING COMPONENTS OF DISPLAY DEVICE

(75) Inventor: Takahiro Ikunami, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 278 days.

(21) Appl. No.: 12/937,760

(22) PCT Filed: Apr. 8, 2009

(86) PCT No.: PCT/JP2009/001638
§ 371 (c)(1),
(2), (4) Date: Oct. 14, 2010

(87) PCT Pub. No.: WO2010/004672
PCT Pub. Date: Jan. 14, 2010

(65) Prior Publication Data
US 2011/0038110 A1 Feb. 17, 2011

(30) Foreign Application Priority Data
Jul. 7, 2008 (JP) ................................. 2008-176845

(51) Int. Cl.
*G06F 1/16* (2006.01)

(52) U.S. Cl. ......... 361/679.01; 361/679.02; 361/679.21; 348/148; 348/837

(58) Field of Classification Search .............. 361/679.01
See application file for complete search history.

(56) References Cited

U.S. PATENT DOCUMENTS

| | | | | |
|---|---|---|---|---|
| 6,633,347 B2 * | 10/2003 | Kitazawa | | 348/837 |
| 6,956,628 B2 * | 10/2005 | Huang | | 349/58 |
| 7,187,540 B2 * | 3/2007 | Homer et al. | | 361/679.21 |
| 2002/0085129 A1 | 7/2002 | Kitazawa | | |
| 2007/0132894 A1 * | 6/2007 | Vitito | | 348/837 |

FOREIGN PATENT DOCUMENTS

| | | |
|---|---|---|
| JP | 2001-105988 A | 4/2001 |
| JP | 2002-200941 A | 7/2002 |
| JP | 2002-240642 A | 8/2002 |
| JP | 2003-323126 A | 11/2003 |
| JP | 2006-282100 A | 10/2006 |

* cited by examiner

*Primary Examiner* — Anthony Q Edwards
(74) *Attorney, Agent, or Firm* — Birch, Stewart, Kolasch & Birch, LLP

(57) ABSTRACT

A component assembling structure for a display device is arranged such that, in a display device 1 including a display device main body 2 having an inner cover 12 composed of a component housing section 13 for covering electronic components and a display housing space 14; and a display 3 supported rotatably by the display housing space 14 of the display device main body 2, wherein a flat cable 31 for connecting the display 3 and the electronic components on the side of the display device main body 2 to each other are provided by an assembly on the side of the display 3, and also a decorative cover 35 is mounted detachably on a ceiling 15 of the display housing space 14 of the inner cover 12.

2 Claims, 2 Drawing Sheets

STRUCTURE FOR ASSEMBLING COMPONENTS OF DISPLAY DEVICE

TECHNICAL FIELD

The present invention relates to a structure for assembling components in a display device.

BACKGROUND ART

Recent automotive vehicles include one having provided therein a display device for a television, DVD, game, or the like for a rear seat occupant. A vehicle including three-row seats or face-to-face seats has a display device provided on a ceiling thereof. Such a display device is composed of a display device main body and a display (monitor) that can be rotated with respect to the main body. The display is used with kept at a predetermined angle with respect to the display device main body.

The display has a structure where a shaft provided on the display is supported by a bracket and the bracket is secured to a base of the display device main body. A controller for the display is assembled in the display device main body, and a flat cable to be connected with the controller is connected to the display.

In the meantime, a plurality of types of colors are prepared for such a display device, and the color of the display device coordinating with the one of a vehicle interior is selected. However, the number of the colors previously prepared is not always equal to that of the requested ones. Therefore, when demand disproportionately concentrates on one color, it is preferable to get the other colors to be available for the requested color. For the method, it is suggested that the display device be composed of a standardized colored portion and a specifically colored portion (gray, beige, or the like) such that the specifically colored portion is replaceable. In this case, it is preferable to prepare the specifically colored portion that can be easily replaced. The display, and a ceiling in the space on the side of the display device main body for housing the display can correspond to the specifically colored potion. In other words, it is required that these portions be changed in color if necessary. For a method of changing the color of the ceiling in the space on the side of the display device main body, it is assumed to re-cover the ceiling of the display housing space.

However, in the display device, the connection of a flat cable to the display side is carried out by connecting the flat cable to a board of a display front under a condition where a display cover is removed from the display composed of the display front and the display cover, then attaching the display front to the display device main body with screws, and thereafter assembling the display cover to the display front; thus, in order to re-cover the ceiling of the display housing space on the side of the display device main body, the display has to be detached from the display device main body, resulting in a troublesome re-covering work.

PRIOR ART DOCUMENTS

PATENT DOCUMENTS

Patent Document 1: JP-A-2003-323126

The present invention has been made to solve the above-mentioned problems, and an object of the present invention is to arrange a display device such that the color of the ceiling of a display housing space in a display device main body can be changed without removing a display from the display device.

SUMMARY OF THE INVENTION

A structure for assembling components of a display device according to the present invention is arranged such that the display device includes: a display device main body composed of a base member on which electronic components are mounted and an inner cover for covering the base member, the inner cover being formed of a component housing section for covering the electronic components and also a display housing space for housing a display; and the display that is housed in the display housing space of the display device main body and is rotatably supported by the base member of the display device main body through a hinge mechanism, wherein the display and a wiring for connecting the display and the electronic components on the side of the display device main body to each other are provided by an assembly, while a decorative cover is mounted detachably to the ceiling of the display housing space of the inner cover.

According to the structure for assembling components of a display device according to the present invention, the decorative cover is adapted to be detachable, which enables to deal easily with changes in color thereof. Further, since the display and the wiring are provided by an assembly (ASSY), replacement of the display can be facilitated, thus improving the property of the assembly.

BEST MODE FOR CARRYING OUT THE INVENTION

Embodiments of the present invention will now be described with reference to the accompanying drawings in order to explain the present invention in more detail.

First Embodiment

Figure 1:
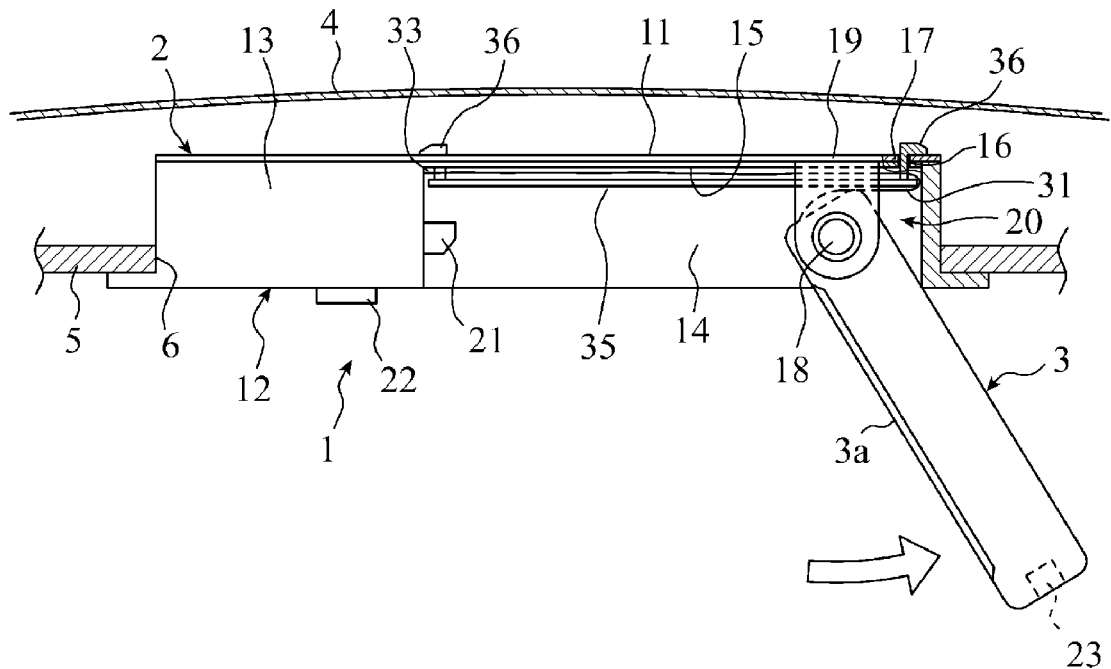
FIG. 1 is a schematic sectional view taken along the side of a display device employing a structure for assembling components in accordance with the first embodiment with a display thereof opened.
Figure 2:
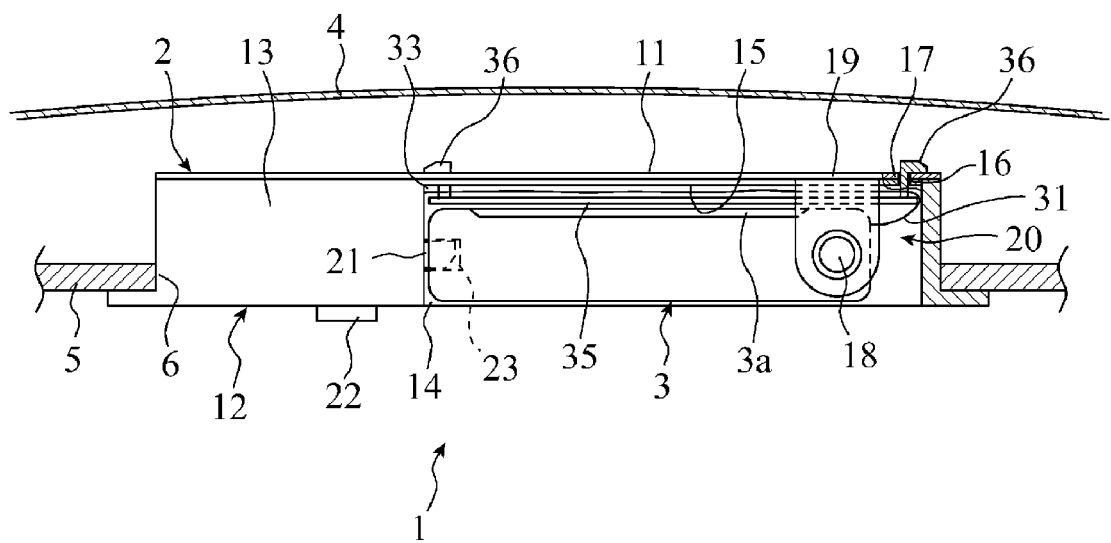
FIG. 2 is a schematic sectional view taken along the side of the display device employing the structure for assembling components in accordance with the first embodiment with the display thereof closed.
Figure 3:
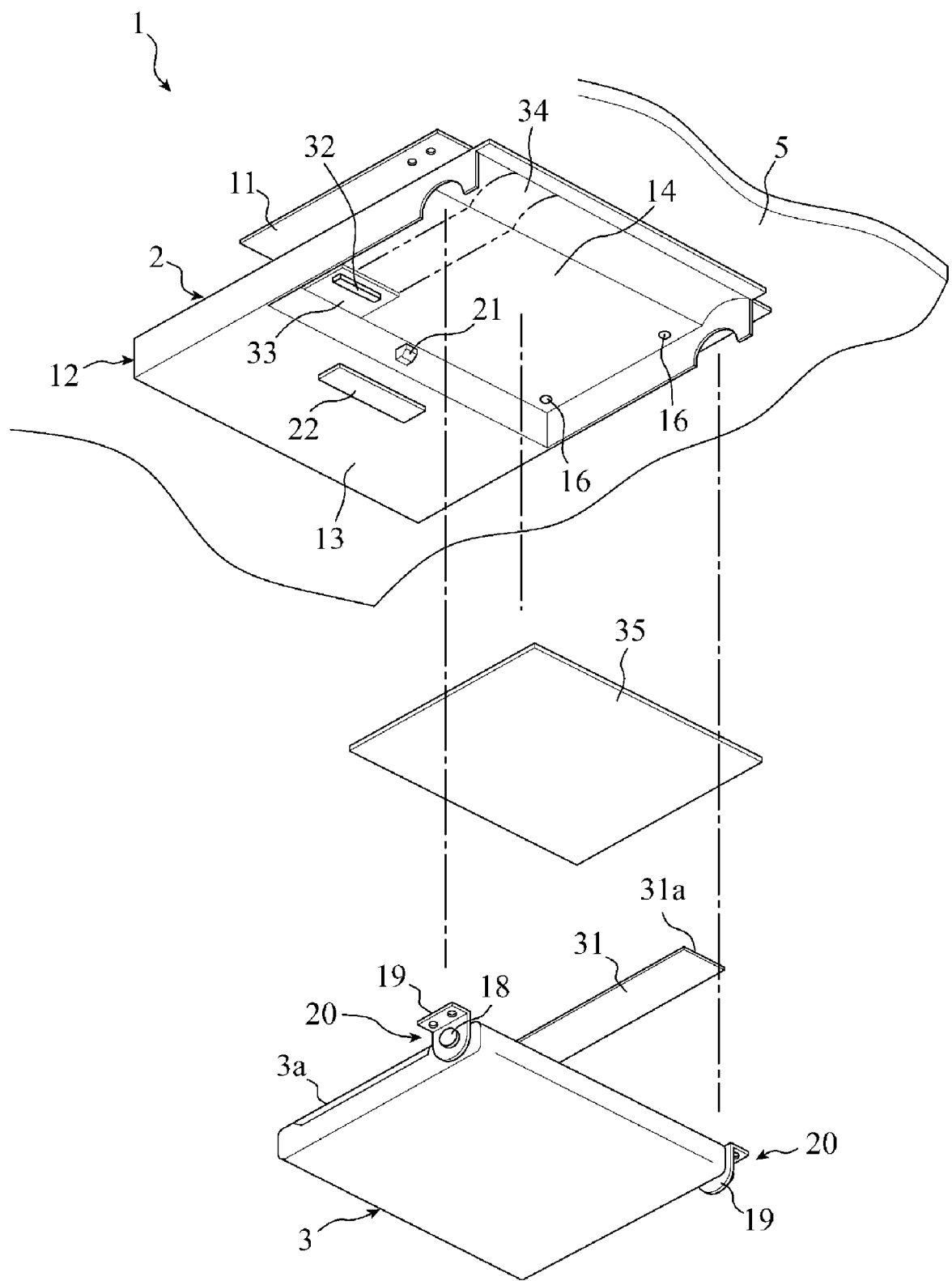
FIG. 3 is an exploded perspective view of the structure for assembling components in accordance with the first embodiment.

In the first embodiment, the present invention is applied to a display device installed on the ceiling of a vehicle. FIG. 1 and FIG. 2 are schematic sectional views taken along the side of a display device in accordance with a first embodiment, FIG. 1 shows a state where a display is opened, and FIG. 2 shows a state where the display is closed, respectively. FIG. 3 is an exploded perspective view of the display device in accordance with the first embodiment.

As shown in FIG. 1 and FIG. 2, a display device 1 is comprised of a display device main body 2 and a display 3 assembled openably and closably to the display device main body 2. The display device 1 is mounted in a roof lining 5 provided internally to a roof 4 of a vehicle. The display device 1 is secured in a mounting hole 6 provided through the roof lining 5 by fitting the display device main body 2 in the mounting hole to be screwed, or using an equivalent method.

The display device main body 2 has a structure where electronic components (a circuit board of a controller or the like) required for operating the display 3 are attached to a metallic and plate-shaped base member 11 and covered with an inner cover 12. The inner cover 12 is composed of a component housing section 13 for covering the electronic components or the like located on the base member 11 and a concave display housing space 14 for housing the display 3. Clip accommodating holes 16 are provided at four corners of a ceiling 15 of the display housing space 14 in the inner cover 12, and clip engaging holes 17 are provided at positions corresponding to the clip accommodating holes 16 in the base member 11, respectively. The inner cover 12 is molded of, e.g., a plastic material or the like. The inner cover 12 is colored by a common color, e.g. black, irrespective of the color of the roof lining 5 that is the interior of the vehicle.

Shafts 18 are projected from both the sides of the base-end portions of the display 3, and the shaft 18 is supported rotatably by a holder (bracket) 19. The holder 19 is fixed to the base member 11 of the display device main body 2 with screws or the like. The shaft 18 and the holder 19 constitute a hinge mechanism 20 for rotatably supporting the display 3. One side of the display 3 forms a display section 3a using liquid crystal. The display 3, by being supported by the hinge mechanism 20, can be moved to an in-service position where the display is opened at a predetermined angle as shown in FIG. 1 from an accommodation position where the display is housed in the display housing space 14 as shown in FIG. 2. The hinge mechanism 20 includes a click mechanism though not shown, and the display 3 can be positioned at one or a plurality of predetermined positions and held at the position.

A latch 21 from the component housing section 13 of the inner cover 12 toward the display housing section 14 is provided. It is configured that the latch 21 can elastically extend and contract by a spring. An operating button 22 is provided on the surface of the component housing section 13, and the latch 21 is adapted to be retracted into the component housing section 13 by pushing the operating button 22. In the meantime, a latch engaging hole 23 is provided at the end face of the rotation side of the display 3. As the display 3 is closed, the latch 21 is fit into the latch engaging hole 23, and the display 3 is held at a closed position. The operating button 22 is pushed to draw the latch 21 from the latch engaging hole 23, thus enabling the display 3 to rotate.

A flat cable 31 as a wiring is assembled previously as an ASSY at the base-end portion of the display 3 (on the side to be supported by the hinge mechanism 20). The flat cable 31 is connected to a predetermined portion of the interior of the display 3 to be assembled thereto. The flat cable 31 is arranged to have a length within which the cable can be connected to a connector (described later) along a predetermined routing path. The tip of the flat cable 31 forms a terminal section 31a to be connected with the connector. Thus, the display 3 is built as an assembly including the flat cable 31.

On the other hand, on the side of the display device main body 2, a connector 32 is provided on the ceiling 15 in the display housing space 14 of the inner cover 12. The connector 32 is mounted on a printed board 33 that is connected with the component housing section 13 and located on the controller side. Further, a guide 34 for guiding the flat cable 31 is formed near the end portion thereof opposite the component housing section 13 of the inner cover 12.

A decorative cover 35 is attached to the ceiling 15 of the display housing space 14. The decorative cover 35 is secured to the ceiling 15 by passing clips 36 provided at the four corners of the cover through the clip accommodating holes 16 provided in the inner cover 12 and the clip engaging holes 17 provided in the base member 11, and further engaging the clips to the base member 11. The flat cable 31 is housed between the ceiling 15 of the inner cover 12 and the decorative cover 35.

In assembling the display device 1 having such a structure, first, the holders 19 for supporting the shafts 18 located on both the sides on the base-end portion side of the display 3 that is an assembly each are fixed to the base member 11 of the display device main body 2. Then, the flat cable 31 is guided to the component housing section 13 of the inner cover 12 along the guide 34 of the inner cover 12, and the terminal 31a of the tip thereof is connected to the connector 32. Thereafter, the decorative cover 35 is installed to the ceiling 15 of the display housing space 14. Installation of the decorative cover 35 is carried out by holding the display 3 in an opening position, inserting one-end side of the decorative cover 35 between the base-end portion of the display 3 and the ceiling 15 to conform the overall cover 35 along the ceiling 15, passing the clips 36 provided at the four corners of the decorative cover 35 through the clip accommodating holes 16 of the inner cover 12 and also the clip engaging holes 17 of the base member 11, and then engaging the clip 36 to the base member 11.

After the installation as discussed above, the display 3 is closed, and housed in the display housing space 14. As the display 3 is housed in the display housing space 14, the latch 21 fits into the latch engaging hole 23, and the display 3 is held in a closed state.

In the display device 1 assembled as described above, when the decorative cover 35 is replaced by the one with another color, the clips 36 of the installed decorative cover 35 are detached from the base member 11 to remove the decorative cover 35 therefrom. Then, a decorative cover 35 with another color is installed. Installation of the decorative cover 35 with another color is performed similarly as discussed above, by holding the display 3 in an open state, inserting one-end side of the decorative cover 35 between the base-end portion of the display 3 and the ceiling 15 to conform the overall cover 35 along the ceiling 15, passing the clips 36 provided at the four corners of the decorative cover 35 through the clip accommodating holes 16 of the inner cover 12 and the clip engaging holes 17 of the base member 11, and thereafter engaging the clips to the base member 11.

According to the component assembling structure for a display device of the first embodiment, the decorative cover 35 is adapted to be removable, which can facilitates replacement of the cover with a decorative cover 35 with another color. Further, the display 3 and the flat cable 31 are provided by an assembly, which can facilitate replacement of the display 3. To be more exact, the display 3 can be also easily replaced with the one with another color. Since the display 3 and the flat cable 31 are provided by an assembly, an ASSY work of the display 3 becomes possible at a previous step different from that of the display device main body 2, which can improve the property of the assembly.

In the first embodiment, the connector 32 for connecting the flat cable 31 on the side of the display 3 and the side of the component housing section 13 of the display device main body 2 to each other is provided in the vicinity of the component housing section 13 in the ceiling 15; however, the position in which the connector 32 is provided is not limited to the above-described one, and the connector can be also disposed in another position.

INDUSTRIAL APPLICABILITY

As described above, in order to make it possible to change the color of the ceiling of the display housing space in the display device main body without detaching the display in the display device, the structure for assembling components of the display device according to the present invention is arranged such that the display device includes: a display device main body composed of a base member on which electronic components are mounted and an inner cover for covering the base member, the inner cover being formed of a component housing section for covering the electronic components and also a display housing space for housing a display; and the display that is housed in the display housing space of the display device main body and is rotatably supported by the base member of the display device main body through a hinge mechanism, wherein the display and a wiring for connecting the display and the electronic components on the side of the display device main body to each other are provided by an assembly, and also a decorative cover is mounted detachably to the ceiling of the display housing space of the inner cover. Thus, the structure is suitable for use in a component assembling structure for a display device to be mounted on motor vehicles or the equivalent.

The invention claimed is:

1. A structure for assembling components of a display device characterized in that the display device comprises:
   a display main body composed of a base member on which electronic components are mounted and an inner cover for covering the base member, the inner cover being formed of a component housing section for covering the electronic components and also a display housing space for housing a display; and
   the display that is housed in the display housing space of the display device main body and is rotatably supported by the base member of the display device main body through a hinge mechanism,
   wherein the display and a wiring for connecting the display and the electronic components on the side of the display device main body to each other are provided by an assembly, and also a decorative cover is mounted detachably on the ceiling of the display housing space of the inner cover.

2. The structure for assembling components of a display device according to claim 1, wherein the wiring is a flat cable, the wiring is connected to the side of the display that is supported by the hinge mechanism, and the flat cable is led to the side of the component housing section of the inner cover along the decorative cover to be connected with the side of the component housing section.

* * * * *